United States Patent [19]

Re Fiorentin

[11] 4,364,264

[45] Dec. 21, 1982

[54] FEELER DEVICE FOR MEASURING SURFACE ROUGHNESS

[75] Inventor: Stefano Re Fiorentin, Turin, Italy

[73] Assignee: Centro Ricerche Fiat S.p.A., Orbassano, Italy

[21] Appl. No.: 221,616

[22] Filed: Dec. 31, 1980

[30] Foreign Application Priority Data

Jan. 8, 1980 [IT] Italy .................. 67019 A/80

[51] Int. Cl.³ .............................................. G01B 17/00
[52] U.S. Cl. ...................................... 73/105; 367/99
[58] Field of Search .................. 73/628, 105, 644; 367/99, 114

[56] References Cited

U.S. PATENT DOCUMENTS

| | | | |
|---|---|---|---|
| 2,985,018 | 5/1961 | Williams | 367/114 X |
| 3,433,058 | 3/1969 | Tobin, Jr. et al. | 73/105 X |
| 4,175,441 | 11/1979 | Urbanek et al. | 73/599 |
| 4,280,354 | 7/1981 | Wheeler et al. | 73/105 X |

*Primary Examiner*—Charles A. Ruehl
*Attorney, Agent, or Firm*—Frost & Jacobs

[57] ABSTRACT

A feeler device for measuring the degree of roughness of an uneven surface being examined, the device comprising a transmitting transducer arranged to convert an electrical signal of a predetermined frequency into an ultrasonic wave propagated through a liquid coupling medium and having a wave length of the same order of magnitude as the uneven surface being examined, a generator being provided to generate and feed the electric signal to the transmitting transducer. A receiving transducer is arranged to receive the ultrasonic wave which is reflected by the surface being examined, the device including a support head for the transmitting transducer and the receiving transducer, the head including a base surface adapted to be rested on the surface being examined, and device also including a processor connected to the transmitting transducer and to the receiving transducer, the processor providing an indication of the phase difference between the ultrasonic signals respectively transmitted and received by the transducers when the base surface of the head rests on the surface being examined.

14 Claims, 9 Drawing Figures

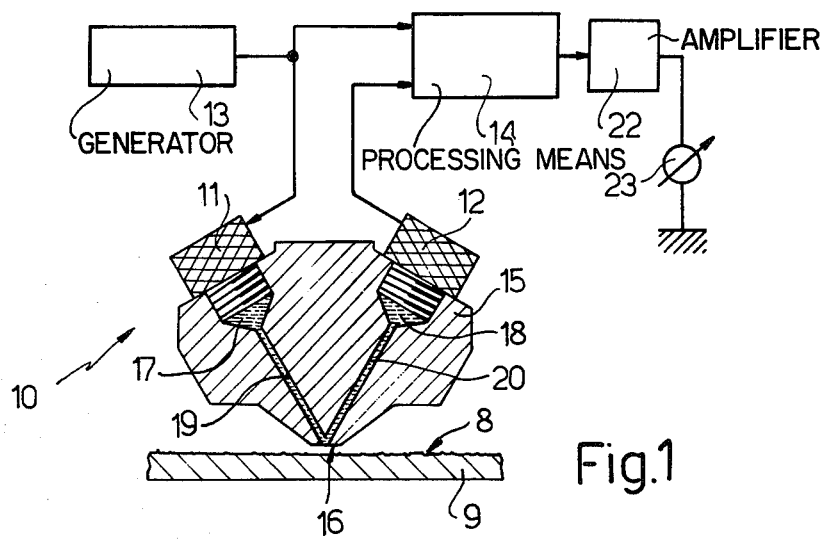
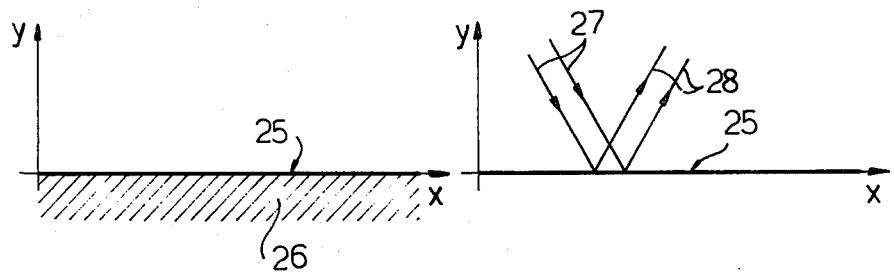
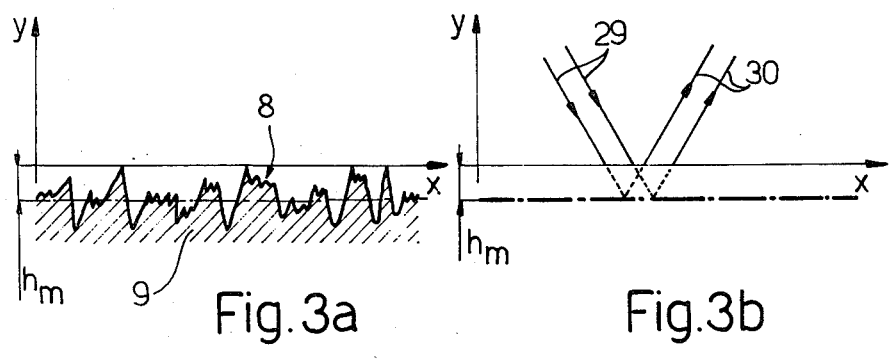

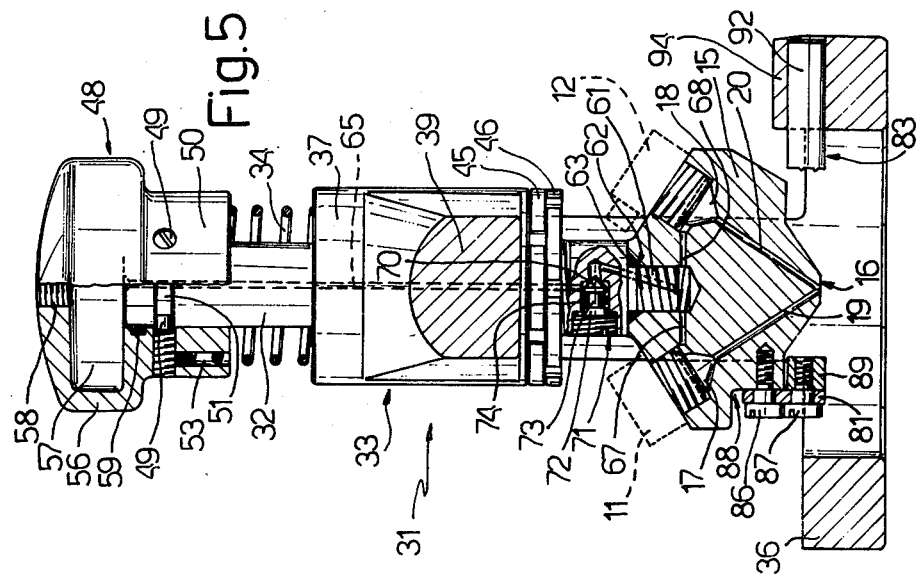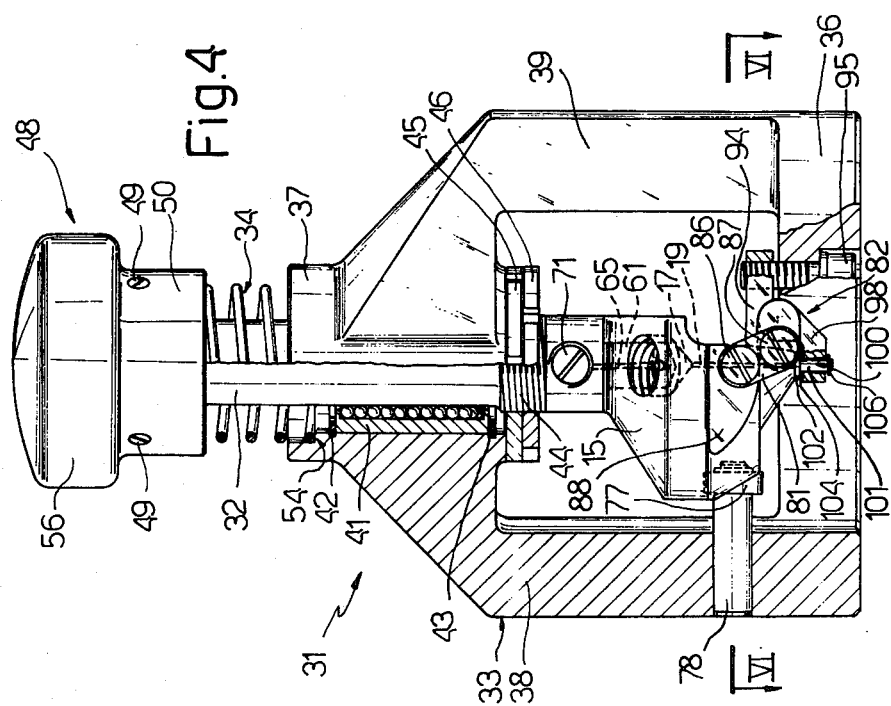

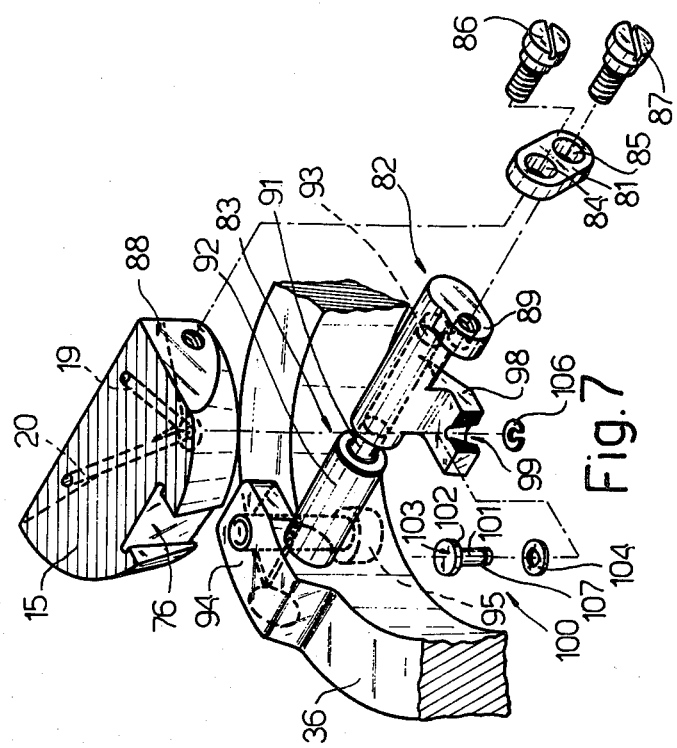
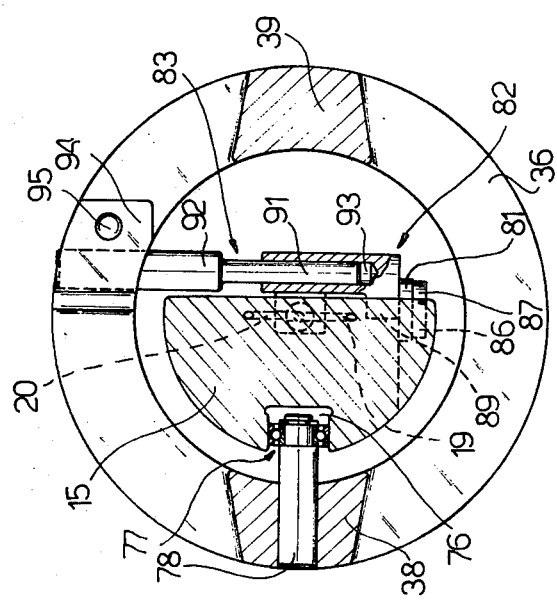

FEELER DEVICE FOR MEASURING SURFACE ROUGHNESS

BACKGROUND OF THE INVENTION

This invention relates to a device for measuring surface roughness.

Known available devices for measuring surface roughness are divided into two groups. The first group comprises those able to make the measurement without direct contact between the device and examined surface, and the second group comprises those which use a sensing element, by means of direct contact, senses the surface unevenness.

Of the devices pertaining to the first group, particular use is made of the microscope, which can be provided with one or two lenses, or be of the interference type. In particular, the microscope with a single lens provides only one surface magnification, whereas that comprising two lenses enables the surface of the examined piece to be observed simultaneously with the surface of a sample piece. The interference microscope is provided with a lamp which emits monochromatic light for illuminating both the examined surface and a smooth comparison mirror simultaneously. Interference fringes form between the examined surface and the mirror, and the degree of roughness can be defined numerically by examining these fringes.

Devices pertaining to the second group generally comprise a feeler needle having a very small point radius, for example of the order of 1–2$\mu$, i.e. of dimensions of the same order as the unevenness of the examined surface. While the examined piece traverses slowly relative to the needle, the latter moves perpendicularly to the surface so that the surface becomes periodically probed. The movement of the feeler needle is measured for example electrically and possibly amplified, and the signal thus obtained is used to operate a writing point which reproduces on paper the variation in the profile of a predetermined section of the said surface.

While known devices of the aforesaid type are widely used for defining the degree of surface roughness, they have certain drawbacks. In particular, microscopes with one or two lenses only allow a qualitative judgement of the surface roughness, whereas an objective numerical evaluation is often required regarding the degree of roughness. In the case of interference microscopes and devices comprising a feeler needle, even though they provide numerical information regarding the degree of roughness, they require the use of highly specialized personnel. In this respect, in the case of the former it is necessary to evaluate the shape of the interference fringes, whereas in the case of the latter it is necessary to process the measured data relative to the profile.

Finally, none of the measuring devices of the said first or second group is suitable for use in rapidly evaluating surface defects in any zone of a workpiece being machined, because they are difficult to handle and are structurally too delicate.

SUMMARY OF THE INVENTION

The object of the present invention is to provide a device for measuring surface roughness, which provides numerical information regarding the degree of roughness of the surface, and can be used for evaluating the degree of roughness of any zone of an examined workpiece.

According to the present invention, a feeler device is provided for measuring the degree of roughness of an uneven surface 8 being examined, characterized by comprising:

a transmitting transducer 11 arranged to convert an electric signal of a predetermined frequency into an ultrasonic wave propagated through a liquid coupling medium and having a wavelength of the same order of magnitude as said unevenness;

a generator 13 arranged to generate said electric signal and feeding said transmitting transducer 11;

a receiving transducer 12 arranged to receive the ultrasonic wave reflected by said examined surface 8;

a support head 15 for said transmitting transducer 11 and receiving transducer 12, said head 15 comprising a base surface 16 to be rested on said examined surface 8, and said transducers 11, 12 being housed in such a manner that the respective transmitting and receiving directions define two coplanar lines which converge at said base surface and which form the same angle with this latter;

and processing means 14 connected to said transmitting transducer 11 and to said receiving transducer 12, and providing an indication of the phase difference between the ultrasonic signals respectively transmitted and received by said transducers when said base surface 16 of said head 15 rests on said examined surface 8.

BRIEF DESCRIPTION OF THE DRAWINGS

The present invention will be more apparent from the description given herein by way of non-limiting example of a preferred embodiment thereof with reference to the accompanying drawings, in which:

FIG. 1 is a diagrammatic view of the essential parts comprising a measuring device constructed in accordance with the present invention;

FIGS. 2a and 3a are profiles, to an enlarged scale, of surfaces of two measured workpieces;

FIGS. 2b and 3b show the path of ultrasonic waves incident on and reflected by the surface of the workpieces of the respective FIGS. 2a and 2b;

FIGS. 4 and 5 are partial elevational sections on two orthogonal planes of an embodiment of part of the device of FIG. 1;

FIG. 6 is a section on the plane VI—VI of FIG. 4; and

FIG. 7 is a partly sectional exploded view of a detail of the embodiment shown in FIGS. 4 and 5.

DETAILED DESCRIPTION OF THE INVENTION

With particular reference to FIG. 1, the reference numeral 10 indicates overall a feeler device for measuring the degree of roughness of a surface 8 of a workpiece 9. The device 10 comprises substantially a transmitting electroacoustic transducer 11 and a receiving electroacoustic transducer 12, an ultrasonic frequency signal generator 13 and a phase measuring circuit 14. More particularly, the transducers 11 and 12 are mounted, preferably screwed, into the upper portion of a support head 15, and have a sensitive surface which faces a respective conical well 17, 18. Each well communicates with the flat base surface 16 of the head 15 by way of a corresponding bore 19, 20 which originates from the vertex of the well. The bores 19 and 20 preferably have a diameter of less than or equal to 1 mm, and are in communication with each other at the surface 16, with respect to which each is disposed in the same orthogonal plane and is inclined at the same angle.

Finally, in a manner not illustrated, lubricating oil is constantly fed into the wells 17, 18 and bores 19, 20 to act as a liquid propagation medium for the ultrasonic waves between the transmitting transducer 11, surface 8 and receiving transducer 12.

The generator 13 is particularly suitable for providing electrical signals of sinusoidal type, and in a frequency range such that the corresponding wavelengths of the ultrasonic waves in oil are of the same order of magnitude as the unevenness of the surface 8. These frequencies preferably lie between 5 to 20 MHz. The generator 13 has its output connected both to the transmitting transducer 11 and to a first input of the phase measuring circuit 14, the second input of which is connected to the receiving transducer 12. Finally, the output of the circuit 14 is connected via an amplifier 22 to a first terminal of an indicating instrument 23, the second terminal of which is connected to earth.

FIG. 2a shows in x,y coordinates the pattern of the profile of a cross-section through a perfectly smooth surface 25 of a workpiece 26, and FIG. 2b shows the path of an incident beam 27 and a reflected beam 28 of a first predetermined signal emitted by the transmitting transducer 11 of FIG. 1.

FIG. 3a shows in x,y coordinates, and to an enlarged scale, the pattern of the profile of a cross-section through the surface 8 of the workpiece 9 of FIG. 1. In particular, $h_m$ indicates the mean deviation of said profile from the profile peaks, these being considered to represent zero on the y ordinate. FIG. 3b shows the path of the incident beam 29 and reflected beam 30 of a second predetermined signal which is also emitted by the transmitting transducer 11 of FIG. 1.

With particular reference to FIGS. 4 and 5, the reference numeral 31 indicates overall a support device for the head 15, and which comprises substantially a pin 32 which carries the head 15 at one end and is axially slidable with respect to a frame 33 against the action of a cylindrical spring 34.

More particularly, the frame 33 is provided with an annular base portion 36 and a tubular trunk 37 disposed coaxially and connected together by two diametrically opposite shoulders 38, 39. In the trunk 37 there is mounted a tubular bearing 41, which is axially constrained to the trunk 37 by means of split rings 42, 43 mounted at opposite ends of the bearing and engaging in corresponding annular grooves (not shown) provided in the inner surface of said trunk 37. The pin 32 is slidable in the bearing 41, and comprises below the trunk 37 an intermediate externally threaded portion 44 (FIG. 4) which is engaged by a ring nut 45 and locking nut 46.

At the opposite end to the portion 44, relative to the trunk 37, the pin 32 is connected to a knob 48 by a plurality of grub screws 49, each of which is screwed into a lower tubular portion 50 of the knob 48 and engages with a radial annular groove 51 (FIG. 5) provided in the pin 32. The tubular portion 50 of the knob 48 comprises an axial annular groove 53 (FIG. 5) which is engaged by the top of the cylindrical spring 34.

The bottom and of the spring 34 rests on a radial annular surface 54 (FIG. 4) provided in the trunk 37.

The knob 48 is also provided with a head portion 56 which comprises internally a chamber 57 communicating with the outside by way of a threaded plug 58 (FIG. 5). Finally, the inner surface of the tubular portion 50 comprises a radial annular groove (not shown) housing a resilient seal ring 59 (FIG. 5). This arrangement therefore provides a sealed connection between the chamber 57 and the outside, on that side of the chamber 57 bounded by the portion 50 and pin 32.

From the lower end of the pin 32 there extends an axial threaded appendix 61 of small cross-section, which engages in a corresponding threaded bore (not shown) provided in the head 15. This bore, in a position corresponding with the zone in which the appendix 61 is connected to the pin 32, comprises a conical surface 62 with its concavity facing outwards, and which defines with the facing surface of said pin 32 a seat (not shown) for housing a resilient seal ring 63.

In the longitudinal direction, the pin 32 comprises a through bore 65 which connects the chamber 57 of the knob 55 to a first end of two radial ducts 67, 68 of the head 15, the second end of which communicates respectively with the wells 17, 18 of the head 15. The bore 65 is intercepted by the conical end 70 of a screw 71. This screw is provided with a threaded head 72 which is screwed into a portion of the pin 32 lying between the threaded portion 44 and the appendix 61. The conical end 70 is arranged to totally close the opening of the bore 65. Finally, the screw 71 has a shank 73 of smaller cross-section, about which there is mounted a resilient seal ring 74.

With particular reference to FIG. 6, the head 15 comprises in its periphery, in a position facing the shoulder 38, a rectangular cavity 76 which extends longitudinally and which cooperates with a rigid radial bearing 77 supported by a pin 78. This pin is forced radially into a corresponding bore in the shoulder 38. Consequently, the bearing 77 acts as an axial guide for the movements of the head 15.

With particular reference to FIG. 7, the head 15 is connected by a plate 81 to a substantially cylindrical block 82, which is mounted offset with respect to the axis of the head 15, and is rotatable about a support pin 83. In particular, the plate 81 comprises two through bores 84, 85 arranged to be engaged by corresponding screws 86, 87, by means of which said plate 81 is connected respectively to a flat front portion 88 of the head 15 and to a radial appendix 89 of the block 82. The pin 83 comprises two portions 91, 92 of different diameters. The portion 91, of smaller diameter, engages in a dead bore 93 in the block 82 at the opposite end to the appendix 89, and the portion 92, of larger diameter, is connected to the annular portion 36 of the support device 31 by means of a bent appendix 94 which extends from the portion 36, and a screw 95 (FIGS. 6 and 7).

Finally, the block 82 comprises in an intermediate position a substantially parallelepiped-shaped appendix 98, provided with a conical through bore 99 with its concavity facing downwards, and housing a pin 100. This pin has a shank 101 which engages the conical bore 99, and a flat circular head 102 with its upper surface 103 perfectly smooth, i.e. free of any roughness to the maximum possible extent (see for example the surface 23 of FIG. 2a). The head 102 rests on the upper surface of the appendix 98 by way of a spring washer 104, which enables the pin 100 and thus the head 102 to make slight axial movements with respect to the axis of said bore 99. A retaining ring 106 is also provided, engaging in an annular groove 107 (FIG. 7) provided in the shank 101 at the opposite end to the head 102, and this keeps the pin 100 constrained to the appendix 98 of the block 82.

The operation of the device 10 is firstly described hereinafter from the theoretical aspect with reference to FIGS. 1 to 3, and then from the practical aspect with particular reference to FIGS. 4 to 7.

The degree of roughness of the surface 8 of the workpiece 9 (FIGS. 1 and 3a) is measured by determining the extent by which the phase difference between the signal received by the transducer 12 and that emitted by the transducer 11 when the surface 16 of the head 15 rests on the flat surface 25 (FIG. 2a) differs from that when the surface 16 of the head 15 rests on the rough surface (FIG. 3a). More particularly, as the surface 25 is perfectly smooth, the reflection of the incident beam 27 takes place at the level at which the ordinate y is zero (FIG. 2b), because of which the signal received by the transducer 12 has a first phase displacement relative to the signal emitted by the transducer 11. This phase displacement depends on the space through which the incident beam 27 and reflected beam 28 pass in passing from the transducer 11 to the transducer 12.

When the head 15 is moved on to the workpiece 9 of which the roughness is to be measured, the surface 16 of the head 15 rests on the peaks of the surface 8 of the workpiece 9 (FIG. 3a), whereas the reflection of the incident beam 29 takes place substantially at the mean level $h_m$ of the profile (FIG. 3b). In this case, a second phase displacement is obtained, this being reliably different from the preceding and depending in particular on the value of the said mean level $h_m$.

The difference between the two measured phase displacements is calculated directly by the circuit 14, which by way of the amplifier 22 provides the instrument 23 with a signal directly proportional to the value $h_m$, and thus to the degree of roughness of the surface 8.

In FIG. 4, the device 31 is shown in its rest position, because of which the upper surface 103 (not shown) of the head 102 of the pin 100 is kept facing the surface 16 (not shown) of the head 15. This position is maintained by the action of the spring 34, which by acting on the knob 48 urges the pin 32 upwards until the ring nut 48 is brought into contact with the lower surface of the tubular trunk 37. The support device 31 stably assumes the said rest position, during which the said first phase difference measurement is made.

To obtain the second phase difference value, the annular portion 36 of the device 31 is rested on the surface to be measured, and the knob 48 is pressed axially, overcoming the resilient action exerted by the spring 34. The head 15 is consequently moved downwards, and this, by means of the plate 81, simultaneously causes the block 82 to rotate about the pin 83. When the surface 16 of the head 15 (FIG. 5) reaches the plane defined by the base surface of the portion 36, the block 82 has been correspondingly rotated through an angle close to 90°, and is thus in a position such as not to interfere with the movement of the head 15. The second said phase difference measurement is made under these conditions.

The chamber 57 of the knob 48 is filled with lubricating oil, which flows through the through bore 65 of the pin 32 and keeps the wells 17 and 18 and ducts 19 and 20 of the head 15 permanently fed. If it is required to stop the flow of oil through the bore 65, for example during the replacement of the head 15, the screw 71 can be turned in order to close the opening of the bore 65 by means of the conical head 70 of said screw.

From an examination of the characteristics of the device 10 according to the present invention, it can be seen that it attains the aforesaid objects.

In particular, if suitably calibrated, the device 10 directly provides a numerical indication of the degree of roughness of the surface under examination, thus releasing the operator from the need to process data or interpret particular configurations of optical type, as heretofore specified.

Moreover, as the support device 31 for the head 15 is extremely manageable and robust, and the transducers 11 and 12 are well protected inside the head 15, all the drawbacks of excessive delicacy of the devices used up to the present time are obviated.

Finally it is apparent that modifications can be made to the described form of the device 10 without leaving the scope of the inventive idea.

For example, wide modifications can be made to that part of the circuit of FIG. 1 downstream of the transducer 12, and to the structure of the support device 32 illustrated in FIGS. 4 to 7.

What we claim is:

1. A feeler device for measuring the degree of roughness of an uneven surface 8 being examined, characterized by comprising:
   a transmitting transducer 11 arranged to convert an electric signal of a predetermined frequency into an ultrasonic wave propagated through a liquid coupling medium and having a wavelength of the same order of magnitude as said unevenness;
   a generator 13 arranged to generate said electric signal and feeding said transmitting transducer 11;
   a receiving transducer 12 arranged to receive the ultrasonic wave reflected by said examined surface 8;
   a support head 15 for said transmitting transducer 11 and receiving transducer 12, said head 15 comprising a base surface 16 to be rested on said examined surface 8, and said transducers 11, 12 being housed in such a manner that the respective transmitting and receiving directions define two coplanar lines which converge at said base surface and which form the same angle with this latter;
   and
   processing means 14 connected to said transmitting transducer 11 and to said receiving transducer 12, and providing an indication of the phase difference between the ultrasonic signals respectively transmitted and received by said transducers when said base surface 16 of said head 15 rests on said examined surface 8.

2. A device as claimed in claim 1, characterized in that said support head 15 comprises a first duct 19 and a second duct 20 which respectively connect each sensitive surface of said transmitting transducer 11 and receiving transducer 12 to said base surface 16, said ducts 19, 20 being positioned in the same transmitting and receiving directions and converging with each other at said base surface 16.

3. A device as claimed in claim 2, characterized in that each said duct 19, 20 widens out at the opposite end to that which communicates with said base surface 16, to define a respective conical well 17, 18, and each said transducer 11, 12 has a sensitive surface disposed at the base of said conical well 17, 18.

4. A device as claimed in claim 3, characterized in that said liquid is fed into each said duct 19, 20 and conical wall 17, 18.

5. A device as claimed in claim 4, characterized in that said liquid is oil.

6. A device as claimed in claim 1, characterized in that said head 15 is mounted rigid with the lower end of a pin 32 which is mobile axially between a first and second position against the action of resilient means 34.

7. A device as claimed in claim 6, characterized by comprising a support frame 33 for said pin 32, said frame 33 comprising a tubular trunk 37, relative to which said pin 32 is slidable; said resilient means comprising a spring 34 compressed between the upper end of said pin 32 and an upper facing surface of said tubular trunk 37.

8. A device as claimed in claim 7, characterized in that said spring 34 is cylindrical and is mounted coaxial to said pin 32.

9. A device as claimed in claim 6, characterized in that said pin 32 comprises in the longitudinal direction a through duct 65 which communicates lowerly, by way of respective ducts 67, 68, with each said well 17, 18 of said head 15, and upperly with a hollow chamber 57 in which said liquid is contained.

10. A device as claimed in claim 9, characterized in that said hollow chamber 57 is provided inside a knob 48 connected in a fluid-tight manner to said upper end of said pin 32.

11. A device as claimed in claim 9, characterized by comprising means 71 for adjusting the opening of said longitudinal duct 65 in said pin 32.

12. A device as claimed in claim 6, characterized by comprising a block 82 rotatable about an axis and connected to said pin 32 in such a manner as to assume a first or a second angular position according to whether said pin 32 assumes said first or second predetermined position; and a pin 100 with an enlarged head comprising a perfectly flat upper surface 103 and supported by said block 82; said pin 32, when in its rest position, assuming a position such that its flat surface 103 faces the base surface 16 of said head 15.

13. A device as claimed in claim 12, characterized in that said block 82 is provided with a conical bore 99 which receives the shank 101 of said pin 100 of enlarged head, and that said head 102 of said pin 100 rests on the surface of said block 82 by way of a spring washer 104 disposed therebetween.

14. A device as claimed in claim 1, characterized in that the signals provided by said generator 13 are sinusoidal, and have a frequency of the order of units or tens of megahertz.

* * * * *